Patented July 3, 1951

2,559,345

UNITED STATES PATENT OFFICE 2,559,345

CASTING METHOD AND COMPOSITIONS

James S. Church, Los Alamos, N. Mex., and Herman R. Tyler, St. Louis, Mo., assignors to the United States of America as represented by the United States Atomic Energy Commission No Drawing. Application February 1, 1950, Serial No. 141,838

7 Claims. (Cl. 260—34.2)

This invention relates to an improved process of casting polymerizable compounds and, more particularly, to a casting composition comprising a solution of polymer in monomer which can be cast at low temperatures and pressures, to the casting of same, and to the cast articles obtained.

Heretofore, manufactured articles have been formed from polymerizable compounds such as methyl methacrylate by casting; that is, disposing them in a mold and subjecting them to temperature conditions which cause polymerization of the monomer to a solid polymer. The casting of plastic compositions is distinguished from the molding of plastic compositions in that, in the various molding processes, pressure is always employed in forming the plastic material to the mold, whereas in casting, the plastic composition is simply poured into the mold. There are serious objections connected with the former casting procedures, such as, the long and irregular casting time, high shrinkage, tendency toward bubble formation and the high temperatures and pressures required in casting certain articles. Another objection is the fact that most prior casting compositions do not have an appreciable storage life.

The long and irregular casting time due, in part, to the long induction period required for polymerization, makes it difficult to standardize an efficient casting process for commercial application. The high shrinkage factor which is due to the fact that the polymer is denser than the monomer, makes it extremely difficult to produce a flawless product of a predetermined size. Bubble formation results from volatilization of the monomer either by the high temperatures used or by the exothermic reaction of polymerization and sometimes causes opacification in the product. The use of high temperatures and pressures, although not undesirable for some articles, is particularly objectionable in the formation of others. Pressure is sometimes applied to the casting composition in the mold, thus raising the boiling point of the monomer and avoiding bubble formation.

A number of prior art patents are each directed to the removal of one of the above difficulties. Patent 2,101,061 to Gordon discloses a method of decreasing the induction period by forming a solution of limited amounts of polymer in monomer prior to polymerization of the monomer. Patent 2,136,423 to Fields et al. relates to a process which avoids lateral shrinkage by use of a particular mold construction in conjunction with the technique of causing polymerization to take place in a narrow zone only. A process for removing bubbles from the shaped masses by use of pressure is disclosed in Patent 2,369,057 to Leary et al. This is a process common to the prior art which must be avoided in the cases where pressure would damage the formed article.

Although these processes and others of the prior art are somewhat effective in removing the particular disadvantage to which each is directed, they are limited in application and none of them furnishes an effective process in which all of the disadvantages mentioned above are avoided.

It is, therefore, an object of this invention to provide an improved process for casting polymerizable compounds.

It is another object of this invention to provide a process for casting polymerizable compounds which reduces casting time, shrinkage factor and bubble formation in the product.

It is still another object of this invention to provide a method of effecting a substantially pure solution of appreciable amounts of the polymeric compound in a monomer for use as a casting composition.

It is a further object of this invention to provide casting compositions of a new type which are pourable, have an appreciable storage life and are capable of being cast at low temperatures.

The above objects are accomplished according to the present invention by effecting the solution of a large amount of a polymeric compound in a monomer by the use of a mutual solvent for the two which has a boiling point below that of the monomer, removing the solvent and casting the resultant solution.

An important feature of the invention lies in the use of the particular solvent to effect actual solution of polymer in monomer. The prior art indicates that polymerizable casting compositions could be improved by increasing the concentration of polymer dissolved in monomer. The optimum method of accomplishing this would appear to be the use of heat and this is the method usually attempted in the past. However, it is impossible to attain a high degree of concentration of polymer in monomer by heat as this initiates polymerization before a sufficiently high concentration is reached. Attempts to attain a maximum concentration of polymer in monomer without benefit of heat resulted in solutions containing only 15 per cent of dissolved polymer at the best. Compositions containing an admixture of greater amounts of polymer in monomer have been used in molding processes, but these preparations have contained polymers which were dissolved only in part with the other part being merely superficially softened. In addition, these compositions were actually molded rather than cast in the final processing stage. Their viscosity was too great to permit pouring and casting in the conventional manner and pressure was required as well as heat to produce a solid compact from them free from voids. It has now been found that by use of the proper solvent, true solutions of polymer in monomer which are substantially pure can be obtained containing up to about 75 per cent by weight of polymer actually dissolved in monomer.

The requirements for the solvent are quite well defined. It must be a mutual solvent for both polymer and monomer to produce effective solution of a high concentration of the polymer in monomer. Also, it must have a boiling point appreciably below that of the monomer to permit its removal by distillation from the polymer-monomer solution before polymerization is initiated. It is this property of the solvent which makes possible its complete removal from the solution before polymerization is initiated, thus leaving a substantially pure polymer-monomer solution for use as a casting composition. In practice, distillation is often carried out at reduced pressures to obtain a sufficiently low boiling temperature. In addition to the above properties, the solvent should preferably be available in substantially anhydrous form in order that the solution be kept free of water as water precipitates the polymer in granular form.

The invention may be illustrated by the following specific example but it is not limited to the exact materials or conditions used as it may be otherwise practiced within the scope of the appended claims.

*Example*

300 grams of methyl methacrylate polymer were placed in a closed vessel with 1,000 milliliters of essentially anhydrous chloroform and allowed to stand for a two to three week interval with only occasional agitation. The resulting solution was then mixed with inhibitor-free methyl methacrylate monomer in the ratio of three parts polymer solution to one part monomer by volume. This mixture was then placed in a three-necked flask fitted with a thermometer, mechanical stirrer and a water-cooled condenser leading to a chloroform trap surrounded by an ice-salt bath and from there to a vacuum pump. The system was evacuated to a pressure of 50–100 mm. and the chloroform removed from the reaction mixture by vacuum distillation.

The flask may be heated by means of a water bath if necessary. Complete removal of chloroform is possible by this method at temperatures not in excess of 37° C. Once the resin is free of solvent, it may be cast immediately or it may be stored in closed vessels for periods of a week or longer under refrigeration. The addition of a small amount of polymer at the time of casting (of the order of 1 per cent on the basis of casting weight) will decrease shrinkage slightly. Resin prepared by this method was cast in open molds in the absence of pressure at temperatures of 50° C. and lower in 1 to 2 days with a shrinkage factor of 3 or 4 per cent as compared to casting times of up to 15 days and shrinkage factors varying from 30 to 50 per cent by prior methods. The product formed was transparent, free from bubbles, contained no distortion from shrinkage, and exhibited qualities far superior to those of articles cast by methods of the prior art. Among other advantages, the composition was found especially suitable for use in mounting small metallographic, biological and geological specimens. It became completely polymerized upon casting and the product was relatively hard and consequently polished well with a minimum clogging of emery papers; it was found to be chemically resistant to the usual etching agents, electrically neutral, and no differential etching occurred between the specimen and the mount.

Other examples of casting compositions of the above esters attained in the process of the invention are given below. Figures are given for the compositions prior to vacuum distillation and initiation of polymerization in the monomer. Exact figures for any preparation depend on the concentration of polymer in the polymer solution used.

[200 gms. polymer/1000 ml. CHCl₃]

|  | Weight (gms.) | Vol. (Ml.) | Weight per cent |
| --- | --- | --- | --- |
| Polymer | 129 | 108 | 9.72 |
| Monomer | 235 | 250 | 17.71 |
| Solvent | 963 | 642 | 72.57 |

Polymer: Monomer ratio, 55:100.
Polymer comprises 35.5% by weight of total methacrylates.

[300 gms. polymer/1000 ml. CHCl₃]

|  | Weight (gms.) | Vol. (Ml.) | Weight per cent |
| --- | --- | --- | --- |
| Polymer | 180 | 150 | 13.69 |
| Monomer | 235 | 250 | 17.87 |
| Solvent | 900 | 600 | 68.44 |

Polymer: Monomer ratio, 77:100.
Polymer: comprises 43.5% by weight of total methacrylates.

The solutions formed were true homogeneous solutions in which there were no undissolved or partially undissolved polymer particles in contrast to admixtures of monomer and polymer of like concentrations formed by prior methods with or without the use of heat. The present compositions poured readily and were otherwise adaptable for casting. They had a storage life up to six months making it possible to store them and transfer and cast them in any convenient mold.

As much polymer as desired may be used in the composition although, as will be obvious to those skilled in the art, the proportion of polymer would never be so great as to give a composition that was not flowable, since otherwise disposition of the composition in molds would be difficult, if not impossible. This invention is especially suited to the preparation of casting compositions containing at least about 15 per cent of polymer completely dissolved in monomer, a composition unavailable heretofore.

In the case of a solution of polymethyl methacrylate in methyl methacrylate prepared by the process of this invention, concentrations of polymer above about 75 per cent give solutions with flow characteristics which are not desirable.

Although methyl methacrylate is chosen as the polymerizable compound for the purpose of illustrating the invention, the invention is not limited to its use. Broadly, the invention encompasses the forming of casting compositions by effecting the solution of any polymer in any monomer in which it is soluble by the use of a mutual solvent for the two and then removing the solvent without initiating polymerization, to any appreciable extent.

Among other compounds which are particularly adaptable to the process are other methacrylic as well as acrylic esters. As the polymeric solute of the casting compositions of this invention may be mentioned, such polymeric mono-methacrylic acid esters as the ethyl, propyl, amyl, isoamyl, octyl, decyl, dodecyl, octadecyl, methoxy-ethyl, ethoxy-ethyl, butoxy-ethyl, and butyl carbitol methacrylates, as well as mixtures thereof, or interpolymers thereof with each other, or with vinyl esters, styrene, or the like. Likewise polymeric mono-acrylates may be used, such as the methyl, ethyl, propyl, butyl, amyl, isoamyl, decyl, dodecyl, octadecyl, cyclohexyl acrylates, as well as mixtures thereof, or interpolymers thereof, or interpolymers with vinyl esters, styrene and the like. As will be obvious from the character of the alcohol residues present in the above esters, what is meant by mono-methacrylic and mono-acrylic esters is esters of these acids with monohydric alcohols. Similarly, poly-methacrylic and poly-acrylic esters are defined as esters of these acids with polyhydric alcohols in which more than one of the hydroxyl groups is esterified.

As the monomeric solvent of the casting compositions may be used, the monomeric form of any of the acrylates and methacrylates disclosed above as well as such esters as diethylene glycol di-methacrylate, glycerol di-methacrylate, beta-diethylaminoethyl methacrylate, beta-di-n-butylaminoethyl methacrylate, aminocyclohexyl methacrylate, triethanolamine mono-methacrylate, beta - N,N - pentamethyleneaminoethyl methacrylate, and the like, as well as the corresponding acrylic acid esters.

It will be noted that the polymeric solute in the case of the above classes of compounds does not include the poly-methacrylates and poly-acrylates while the monomeric solvent is not thus restricted. The reason for this is that the poly-methacrylates and poly-acrylates are not soluble in monomer and therefore cannot be used.

Whatever polymerizable compounds are used, they should first be freed of polymerization inhibitors by methods well known to those skilled in the art. The presence of these compounds may produce effects similar to those produced by the use of high distillation pressures, and therefore, temperatures, in the removal of the mutual solvent, that is, production of a rubbery casting which cracks on complete solidification. In fact, the production of the most desirable type of product according to this invention is somewhat dependent on freedom from impurity of the polymer-monomer solution before polymerization as it has been found that the presence of inhibitors, solvents, catalysts, etc., may adversely affect the properties of the product, usually resulting in deformation or voids.

The solvent used will, of course, depend on the polymer and monomer used and their properties. Chloroform was selected as the solvent in this case as it was found to be miscible with monomeric methyl methacrylate in all proportions and capable of dissolving up to 300 grams of polymer per 1000 cc. on standing in contact at room temperatures for extended intervals. Approximately 100 grams/1000 cc. will dissolve per week contact with occasional agitation. Solutions prepared in this manner have been found stable on storage for six months or longer, if evaporation of choloroform is prevented. This solvent has a boiling point well below that of monomeric methyl methacrylate so that its complete removal is possible by vacuum distillation below the polymerization temperature of the monomer-polymer solution. Complete removal before polymerization is important as it has been found that residual chloroform increases casting time and shrinkage and may lead to bubble formation or the production of a rubbery cast article which may also be deformed by escape of the solvent. Among other solvents which may be used are methyl formate, methylene chloride, acetone and ethyl acetate. These solvents have the property in common with chloroform that they are all mutual solvents for monomeric and polymeric methyl methacrylate and have boiling points below 78° C.

The temperature and pressure used for removal of the solvent by distilation will, of course, vary with the polymerizable compound and the solvent used. In the case of methyl methacrylate and chloroform, the preferred pressure is between 50 and 100 mm. and the preferred temperature in the neighborhood of 30° C. It is important that the temperature remain below that which will initiate polymerization in order to permit complete removal of the solvent before the solution becomes too viscous. The correct temperature can usually be obtained by adjusting the pressure. In no event should the temperature exceed 80° C. when methyl methacrylate is used, as the polymerization reaction is likely to go to completion at this point.

The particular manner of carrying out the casting is not of importance in the present invention. It is an advantage of the invention, however, that the composition can be cast in open molds at temperatures of 50° C. or less. However, the use of higher temperatures is not precluded or, if desired, transparent molds may be employed and the composition polymerized in the molds at ordinary temperatures by exposure to ultra violet light.

The use of auxiliary agents, such as polymerization catalysts and the like, is permissible but not essential to the practice of this invention. As stated previously, their presence sometimes tends to cause bubble formation during casting as well as other undesirable effects in the finished product.

Among the polymerization agents which may be used in small quantities are benzoyl peroxide, barium peroxide, sodium peroxide, hydrogen peroxide, peracetic and other per acids, ozone and ozonides. Activators, such as tertiary amines, may also be used with certain of these agents.

When the nature of the finished product permits it, the usual auxiliary agents familiar to those skilled in the art may be incorporated with the casting compositions of the present invention. Plasticizers may be incorporated into either the monomer or polymer prior to admixture, or into the polymer-monomer solution, and suitable plasticizers include dibutyl phthalate, tricresyl phosphate, diethyl phthalate, phthalid, triacetin, dibutyl tartrate, and diethyl succinate. Pigments, fillers, dyes, cellulose derivatives, and natural and synthetic resins are other modifying agents which may be used. When pigments are used, they may be incorporated into the casting compositions by the methods well known to those skilled in the art.

The following table gives the results of a series of tests obtained in making methyl methacrylate castings by the method of this invention in its preferred form and as modified by the use of polymerization catalysts and by various solution and casting conditions. For comparative purposes, the table also gives the results obtained in making castings according to a standard method of the prior art. The casting composition used in the standard method contained 10 per cent by weight of polymer to monomer admixed therewith and heated under reflux. All other compositions contained polymer and monomer in a ratio of 1:3 and were made by use of a mutual solvent in accordance with the method of this invention. In each test, except the standard, results were obtained from two or more samples. Shrinkage data was obtained by water displacement measurements since shrinkage exaggerates the meniscus effect and makes straightforward measurements impossible. All castings were made in open molds to give maximum shrinkage values. Where bubbling was severe, finished castings were compressed to collapse the bubbles prior to making shrinkage measurements, so "shrinkage" as expressed below, includes all decrease in volume which occurred in the polymerization-casting process. Approximately 75 gram castings were made in the shape of 1½ inch diameter cylinders. As the table indicates, approximately 1 gram of polymer was added to the resin in some cases at the time the castings were poured.

versely affects the product emphasizes the importance of obtaining a solution of the highest degree of purity before polymerization is initiated. As illustrated by the above tests, the optimum distillation temperature for the chloroform-methyl methacrylate combination is in the neighborhood of 30° C. It should be noted also that the presence of polymerization catalysts is actually disadvantageous as shown by tests V—C, V—D and VI—C. The tests further show that the addition of small amounts of polymer in the casting step is advantageous and that the presence of polymerization inhibitor is disadvantageous.

An advantage of the invention is that it furnishes an improved method of casting polymerizable compounds by which casting time, shrinkage factor and bubble formation are substantially reduced. This results from the novel procedure of forming a true solution of the required amount of polymeric compound in monomeric compound by the use of a mutual solvent for the two and then removing the solvent to produce a substantially pure casting composition. Another advantage of the invention is that it provides a method of producing casting compositions which have pourability, an appreciable storage life and which can be cast at low temperatures to form articles which are free from many

| | Distillation Temperature | Distillation pressure | Minimum Storage Life | Casting Conditions | | | Results | |
|---|---|---|---|---|---|---|---|---|
| | | | | Time | Temperature | Catalyst or Other | Bubbles | Shrinkage |
| | °C. | Millimeters | Days | Days | °C. | | | Per cent |
| Standard | | | | 4–8 | 30 | Ultra-violet light used | Yes | 50 |
| I-A | 68–72 | | 60 | 2½–5 | 50 | 0.1% benzoyl peroxide | | 46 |
| I-B | 68–72 | | 60 | 15 | 30 | | Yes | 40 |
| I-C | 68–72 | | 60 | 2½–5 | 50 | Polymer added | Yes | 30 |
| II-A | 68–72 | | 60 | 2½–5 | 50 | | Yes | 30 |
| II-B | 68–72 | | 60 | 14 | 30 | | Yes | 31 |
| II-C | 68–72 | | 60 | 2½–5 | 50 | Polymer added | Yes | 25 |
| III-A | 37–40 | 400–450 | 15 | 3 | 50 | | No | 22 |
| III-B | 37–40 | 400–450 | 15 | 7 | 30 | | No | 22 |
| III-C | 37–40 | 400–450 | 15 | 3 | 50 | Polymer added | No | 19 |
| IV-A | 33 | 200 | 15 | 2 | 50 | | No | 14 |
| IV-B | 33 | 200 | 15 | 5 | 30 | | No | 14 |
| V-A (Preferred) | 30 | 50–100 | 4 | 1 | 50 | | No | 3 |
| V-B (Preferred) | 30 | 50–100 | 4 | 2 | 35 | | No | 4 |
| V-C | 30 | 50–100 | 4 | 1 | 50 | Benzoyl peroxide, polymer added | Yes | 8 |
| V-D | 30 | 50–100 | 4 | 3–4 | 70 | Tricresyl phosphate, polymer added | Yes | 10 |
| VI-A | 30 | 50–100 | 6 | 1 | 50 | | No | 11 |
| VI-B | 30 | 50–100 | 6 | 1 | 50 | Polymer added | | |
| VI-C | 30 | 50–100 | 6 | 1 | 50 | Benzoyl peroxide, cresyl phosphate, polymer added | Yes | 8 |
| VII-A | 30 | 50–100 | 2 | 1 | 50 | | No | 5 |
| VII-B | 30 | 50–100 | 2 | 1 | 50 | Polymer added | No | 3 |
| VIII | 30 | 50–100 | 30 | 11–12 | 70 | Inhibitor not removed | No | 60 |

It will be seen from the above table that the process of the invention produces a product of greatly improved quality as compared with the product made by the standard method. This is apparent from the fact that the shrinkage factor of the product made by the standard method is higher than those made by the method of the invention in all tests. Also, the product formed by the preferred process of this invention is free from bubbles. The importance of a low distillation temperature for removal of solvent is emphasized by the fact that shrinkage and bubble formation decrease correspondingly with reduction in distillation temperature and pressure as exemplified by tests I—A to V—A inclusive. This is due to the fact that the low temperature used permits removal of all the solvent before polymerization is initiated. The fact that incomplete removal of solvent in the casting composition adof the undesirable qualities of cast articles made by prior methods.

The invention can be readily applied by anyone skilled in the art. In order to apply the invention, it is only necessary, after selection of the appropriate monomer and polymer, to select a mutual solvent for the two having a boiling point below that of the monomer, effect a high degree of solution of polymer in monomer by use of the solvent, remove the solvent by distillation at a temperature below that necessary to initiate polymerization—by use of reduced pressure if necessary—and cast the resulting pure solution of polymer in monomer under conditions to effect polymerization of the monomer.

As many apparently widely different embodiments of this invention may be made without departing from the spirit and scope thereof, it is to be understood that the invention is not limited to the specific embodiments thereof except as defined in the appended claims.

What is claimed is:

1. The method of casting methyl methacrylate which comprises dissolving polymeric methyl methacrylate in monomeric methyl methacrylate with the aid of chloroform, removing the chloroform by vacuum distillation at a temperature of about 35° C. under a pressure of about 200 mm. and casting the resulting polymer-monomer solution at a temperature not in excess of 50° C.

2. The method of casting methyl methacrylate polymer which comprises dissolving from about 15 to 75 per cent of polymeric methyl methacrylate in monomeric methyl methacrylate with the aid of chloroform, removing the chloroform prior to polymerization by distillation at a temperature not in excess of about 30° C. under a pressure of from about 50 to 100 mm. and casting the resulting polymer-monomer solution at a temperature not in excess of 50° C. to effect polymerization of the monomer.

3. The method of casting methyl methacrylate which comprises dissolving polymeric methyl methacrylate in monomeric methyl methacrylate with the aid of a solvent from the class consisting of methylene dichloride, methyl formate, acetone and chloroform, removing the solvent by vacuum distillation essentially without initiating polymerization of the monomer and casting the resulting polymer-monomer solution at a temperature not in excess of 50° C.

4. The method of casting methyl methacrylate polymer, which comprises forming a solution of about 9 to 14% polymeric methyl methacrylate, 17 to 18% monomer methyl methacrylate, and the remainder chloroform, removing the chloroform at a temperature not in excess of about 30° C., under a pressure from about 50 to 100 mm., and casting the resulting polymer-monomer solution at a temperature not in excess of about 50° C.

5. The method of casting methyl methacrylate which comprises dissolving polymeric methyl methacrylate in monomeric methyl methacrylate with the aid of methylene dichloride, removing the methylene dichloride with vacuum distillation at a temperature not in excess of 68° C. essentially without initiating polymerization of the monomer and casting the resulting polymer-monomer solution at a temperature not in excess of 50° C.

6. The method of casting methyl methacrylate which comprises dissolving polymeric methyl methacrylate in monomeric methyl methacrylate with the aid of methyl formate, removing the methyl formate with vacuum distillation at a temperature not in excess of 68° C. essentially without initiating polymerization of the monomer and casting the resulting polymer-monomer solution at a temperature not in excess of 50° C.

7. The method of casting methyl methacrylate which comprises dissolving polymeric methyl methacrylate in monomeric methyl methacrylate with the aid of acetone, removing the acetone with vacuum distillation at a temperature not in excess of 68° C. essentially without initiating polymerization of the monomer and casting the resulting polymer-monomer solution at a temperature not in excess of 50° C.

JAMES S. CHURCH.
HERMAN R. TYLER.

REFERENCES CITED

The following references are of record in the file of this patent:

UNITED STATES PATENTS

| Number | Name | Date |
| --- | --- | --- |
| 2,071,932 | Macht | Feb. 23, 1937 |
| 2,101,061 | Gordon | Dec. 7, 1937 |
| 2,347,320 | Hiltner | Apr. 25, 1944 |
| 2,369,593 | Marks et al. | Feb. 13, 1945 |